(No Model.)
J. A. KENDALL.
ELECTRIC BATTERY.
No. 353,141. Patented Nov. 23, 1886.
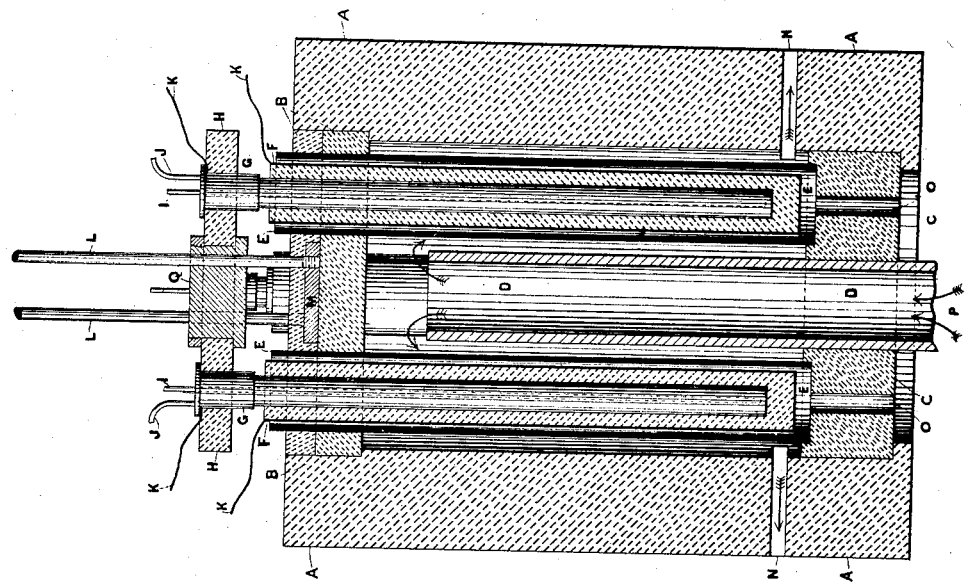
Witnesses
Caroline E. Davidson
Rowena C. Gone[?]
Inventor
James Alfred Kendall
by his attorneys
Pope & Edgecomb

UNITED STATES PATENT OFFICE.

JAMES ALFRED KENDALL, OF MIDDLESBROUGH, COUNTY OF YORK, ENGLAND.

ELECTRIC BATTERY.

SPECIFICATION forming part of Letters Patent No. 353,141, dated November 23, 1886.

Application filed January 18, 1886. Serial No. 188,821. (No model.) Patented in England March 21, 1883, No. 1,481, and in France September 17, 1883, No. 157,599.

*To all whom it may concern:*

Be it known that I, JAMES ALFRED KENDALL, a subject of the Queen of Great Britain, residing at Middlesbrough, in the county of York, in the Kingdom of England, have invented certain new and useful Improvements in Electric Batteries, (for which I have received Letters Patent in England, dated March 21, 1883, No. 1,481, and in France September 17, 1883, No. 157,599,) of which the following is a specification.

This invention consists of an apparatus for obtaining electricity by means of hydrogen in a battery exposed to a red heat, and consisting of two metallic plates, tubes, or boxes, with a saline or vitreous or vitrified substance, hereinafter called the "medium," between them. One metallic plate or tube is exposed to the hydrogen or a gas or mixture of gases containing free hydrogen, the other metallic surface being exposed to heated air or oxygen. I prefer tubes or boxes to plates. If the apparatus be in the tubular form, the inner tube is supplied in its interior with the hydrogen, and the exterior tube is exposed to heated air in a flue, so that the entire structure shall be at a red or higher heat, the temperature required being determined by the materials used. As regards materials, the plate, box, or tube exposed to the oxygenating atmosphere must be of some non-oxidizing metal—such as platinum or palladium. The box exposed to the hydrogen can be of platinum, palladium, gold, iron, nickel, molybdenum, copper, or silver, all these metals being pervious to hydrogen at a red heat; but some of these are inferior to others, and I prefer platinum as giving the best results in my experiments so far.

The medium between the plates, boxes, or tubes can be almost any vitreous material not having a corrosive action on the metals used, or clay or earthenware saturated with chloride of sodium, potassium, calcium, or barium, a fusible silicate, alkaline, borate, or mixture of these, or a porous refractory material—such as earthenware or fire-brick permeated with vitreous matters. Some other salts than those mentioned can be used; but they are not so advantageous.

When using layers of glass or enamels between the electrodes, I avoid as far as possible the presence of metallic oxides which are reducible by hydrogen—such, for instance, as the higher oxides of iron—so as to prevent disintegration of the medium by the formation of bubbles in its substance.

In constructing apparatus of earthenware I select materials which will give the rigidity necessary for the permanence of the apparatus when it is exposed to a strong heat.

The two metallic plates or boxes can be mere films of metal electro deposited or plated on the surfaces of a refractory tube of porous earthenware, the pores of which are filled with a more fusible vitreous or such saline substance as already described; or the medium can consist of a box formed of such material plated inside and out with the metal or metals required. The two metal plates or films form the two electrodes of the battery, and are of course insulated from each other, being in great measure the equivalents of the zinc and copper plates of an ordinary battery—with this important difference, that they are neither of them consumed, the hydrogen permeating them at a red heat being the body oxidized.

The production of electricity in the manner and by the means hereinbefore described does not, indeed, admit of corrosion of either of the metallic plates or layers by the substance used as the medium, but depends upon the continuous absorption of hydrogen by one of the metal plates or layers and its passage through the medium, and the other plate to the oxygen to which it is exposed on its outer surface, the whole being kept at a red heat or at a higher temperature, so as to enable the hydrogen to penetrate the materials employed, the medium at a red heat, though otherwise not necessarily a good conductor, becoming a good conductor by the hydrogen passing through it.

The apparatus is susceptible of considerable variation; but a form I have found to work best in practice is set forth in the drawing hereunto annexed.

The figure represents a longitudinal section of a cylindrical furnace for a battery of four cells arranged in a circle, the section being through the centers of two cells and through the center of the group and apparatus generally.

A is the wall of the furnace, preferably of fire-brick; B, fire-clay top disk with holes for cells; C, lower disk, of same material; D, central flue, up which heat passes from fire at P, as shown by arrows. The fire at P may be a series of gas-jets or other furnace. E are tubes of fire-resisting porcelain; F, platinum tubes, preferably furrowed or corrugated longitudinally; G, inner platinum tubes, plain or furrowed; H, earthenware disk for holding the inner tubes, and provided with a metal plug, Q, for sliding up and down iron rods L L, and adjustable therein by set-screws or otherwise; I, tubes for conveying hydrogen gas to bottoms of cells; J, exit-tubes for waste gas; K, conductors for electric currents; L, three iron rods (two only are shown in drawing) upon which Q slides. A central tube of single larger diameter might take the place of the three; M, small metal disk embedded in disk B. Into this disk M the rods L are screwed. N are exits for heating-gases from furnace; O, holes to allow atmospheric air to come in contact with the outer platinum tubes, P, opening from furnace between platinum tubes F and G. The vitreous or saline material already described as the medium is added, either in the liquid state or is fused in place by submitting it to intense heat. The porcelain tubes E are simply used to protect the cells and equalize the heat and prevent the furnace-gases from adulterating the air supplied to the outer surface of the outer platinum tube.

The effluent gases both from the flue and from the cells leave the apparatus at a high heat. I therefore use them for heating the air used in the apparatus on the regenerative principle, the gases passing through one chamber of the regenerator in one direction while the air is passing through the other chamber in the opposite direction, as in ordinary practice on a large scale the heat of the waste gases will be utilized in the hydrogen-generator.

In the working of these generators, whether the platinum tube form of cell or the clay porous tube be used, the action upon which the production of electricity depends is the passing of hydrogen through the arrangements of metals and media referred to. This passage of hydrogen does not involve the decomposition of the medium used. Whether the action is electrolytic—viz., by the aid of minute quantities of water in the red-hot glass, &c.—is not known, and might be very difficult to ascertain; but whether we assume the presence of $H_2O$ or not, the fact remains that currents of electricity of considerable power can be produced in this way.

The metal tubes may be considered as filters which allow the hydrogen to penetrate, while other gases are prevented from passing, and can be used as fuel.

It will be seen that this method of working is quite different in its plan from all forms of carbon batteries in which it is attempted to burn carbon in contact with an electrolyte; also, it differs from all batteries in which a red heat is used, and in which one of the metallic electrodes is gradually dissolved by the salt used. In such a case evidently the salt will by degrees become inert, while the metallic electrode will have become corroded away.

I claim as my invention—

1. The apparatus for generating electricity, consisting of the combination, substantially as set forth, of two metallic electrodes, a saline or vitreous substance between them adapted to be permeated by heated hydrogen, and an ingress for heated gases.

2. In an apparatus for generating electricity, the combination of a pair of metallic electrodes, F G, and a solid mass of material, such as described, separating the electrodes, the whole being permeable by hydrogen at a red heat or the heat employed.

3. In an apparatus for generating electricity by means of gases, an electricity-generating cell consisting of metallic plates or electrodes, a mass of saline or vitreous material separating them, and a heating-flue surrounding the same, substantially as described.

4. In an apparatus for generating electricity by means of hydrogen, the electrodes, and a medium separating the electrodes consisting of a solid material, such as described, of low conductivity when cold, but becoming a good conductor when heated and permeated by a current of hydrogen passing through it.

5. In an apparatus for generating electricity, the combination of a tubular electrode, means for supplying heated air to the same, a non-metallic medium, such as described, within the electrode, a central tubular electrode, and means for supplying the inner surface of the same with free hydrogen, all substantially as described.

6. In a battery, the combination of the furnace-flue D, for supplying highly-heated gaseous matter to the upper part of the battery, a series of cells, an outer flue surrounding the cells for receiving said highly-heated gaseous matter and delivering it at the bottom.

7. In a battery, the combination of the air-passage O, the suspended cell F, means for applying furnace-heat, and a porcelain tube and intervening air-space separating the cell from the source of heat.

8. The hereinbefore-described method of generating electricity, which consists in supplying heated hydrogen or mixture of gases containing uncombined hydrogen to a material permeable by heated hydrogen, and in causing such hydrogen to pass from one to the other electrode of the battery and preventing the passage of other gases.

In testimony whereof I have signed my name to this specification in the presence of two subscribing witnesses.

JAMES ALFRED KENDALL.

Witnesses:
I. A. BRUNTON,
K. E. BRUNTON.